United States Patent [19]

Ringel

[11] Patent Number: 4,790,699
[45] Date of Patent: Dec. 13, 1988

[54] AIR FEED TUBE ASSEMBLY FOR A PNEUMATIC CHUCK

[75] Inventor: Michael Ringel, Ramat Gan, Israel

[73] Assignee: Amcor Ltd., Tel-Aviv, Israel

[21] Appl. No.: 40,162

[22] Filed: Apr. 20, 1987

[30] Foreign Application Priority Data

Apr. 22, 1986 [IL] Israel .................................. 78582

[51] Int. Cl.[4] .......................... B23Q 5/04; B23B 31/30
[52] U.S. Cl. ....................................... 409/231; 82/30;
137/580; 279/4
[58] Field of Search ................... 279/2 A, 4; 285/134,
285/136; 82/30, DIG. 6; 409/231; 137/580

[56] References Cited

FOREIGN PATENT DOCUMENTS 538509 11/1931 Fed. Rep. of Germany .......... 279/4
1430417 3/1976 United Kingdom .................... 279/4

Primary Examiner—Gil Weidenfeld
Assistant Examiner—Steven C. Bishop
Attorney, Agent, or Firm—Browdy and Neimark

[57] ABSTRACT

A rotary coaxial air feed tube assembly for a pneumatic chuck with one end of the assembly screw coupled to the chuck and the other end of the assembly being coupled to a rotary air feed joint, keying means being provided for coupling the feed tube assembly to a rotary drive spindle so as to impart a rotary drive to the assembly and to the chuck.

4 Claims, 4 Drawing Sheets

AIR FEED TUBE ASSEMBLY FOR A PNEUMATIC CHUCK

BACKGROUND OF THE INVENTION

This invention relates to an air feed tube assembly for a pneumatic chuck.

In known air feed tube assemblies, a set of coaxial air feed tubes are provided by means of which compressed air can be selectively fed from an air supply so as to open and close the gripping jaws of the pneumatic chuck. The air feed tube assembly itself is coupled to the machine spindle of a turning lathe so that the turning moment generated in the lathe is transmitted via the assembly to the pneumatic chuck. In consequence, and in addition to the pneumatic coupling of the air feed assembly with the pneumatic chuck, the chuck must also be mechanically coupled to the air feed tube assembly so as to allow for the transmission of the turning moment. This mechanical and pneumatic coupling of the air feed tube assembly to the pneumatic chuck is effected at one end of the air feed tube assembly, whilst the other end of the assembly is coupled to a rotary air feed joint which is, in its turn, coupled to the air supply. Clearly, in view of the fact that the air feed tube assembly rotates whilst the air feed joint, coupled to the fixed air supply, must of necessity be stationary, the air feed tube assembly must be coupled to the air feed joint via a suitable bearing and, in this connection, the known form of coupling has been by way of closely fitting bearing surfaces.

In many cases, it is known to provide for the flow of a liquid coolant medium through an innermost tube of the air feed tube assembly and, here again, means are provided for coupling the air feed joint to a source of liquid coolant. Where such liquid coolant is provided, it has to be ensured that the liquid coolant itself does not leak into the region of the bearing surfaces.

With known air feed tube assemblies for pneumatic chucks, the assembly is screw-coupled to the pneumatic chuck and the entire drive from the lathe is transmitted to the chuck via this screw coupling. However, such screw-coupling carries with it the danger that, each time the drive force is interrupted, reversed or reduced, a reverse turning moment acts upon the air feed tube assembly which tends to result in the uncoupling of the assembly from the chuck.

BRIEF SUMMARY OF THE INVENTION

It is an object of the present invention to provide a new and improved air feed tube assembly for a pneumatic chuck in which the above-referred to danger is substantially reduced or avoided.

In accordance with the present invention there is provided a rotary, coaxial, air feed, tube assembly for a pneumatic chuck, a first end of said assembly being adapted to be screw-coupled to a pneumatic chuck, a second end of said assembly being adapted to being coupled to a rotary air feed joint and keying means for key coupling said air feed tube assembly to a rotary drive spindle so as to transmit a rotary drive to the assembly and to the pneumatic chuck.

Preferably, keying is affected by means of suitably formed splines.

Thus, by virtue of the fact that the air feed tube assembly is keyed to the rotary drive spindle, the entire drive is imparted to the air feed tube assembly and therefore to the pneumatic chuck via the keying means and any reversely directed turning moment applied to the air feed tube assembly cannot result in the reverse rotation of the air feed tube assembly and the uncoupling thereof from the pneumatic chuck.

Preferably, the end of the air feed tube assembly remote from the pneumatic chuck is coupled to the air feed joint via a pair of axially spaced apart rotary bearings, the use of such spaced apart bearings considerably reducing the frictional resistance to movement which would otherwise be experienced by the air feed tube assembly.

In accordance with a preferred embodiment, means are provided for directing a liquid coolant medium through an innermost tube of the air feed tube assembly. This liquid coolant is supplied to the air feed tube assembly via a supply coupling and in consequence, sealing means have to be provided for substantially preventing leakage of the liquid coolant into the rotary bearings.

BRIEF DESCRIPTION OF THE DRAWINGS

For a better understanding of the present invention and to show how the same may be carried out in practice, reference will now be made to the accompanying drawings, in which.

Figure 1:
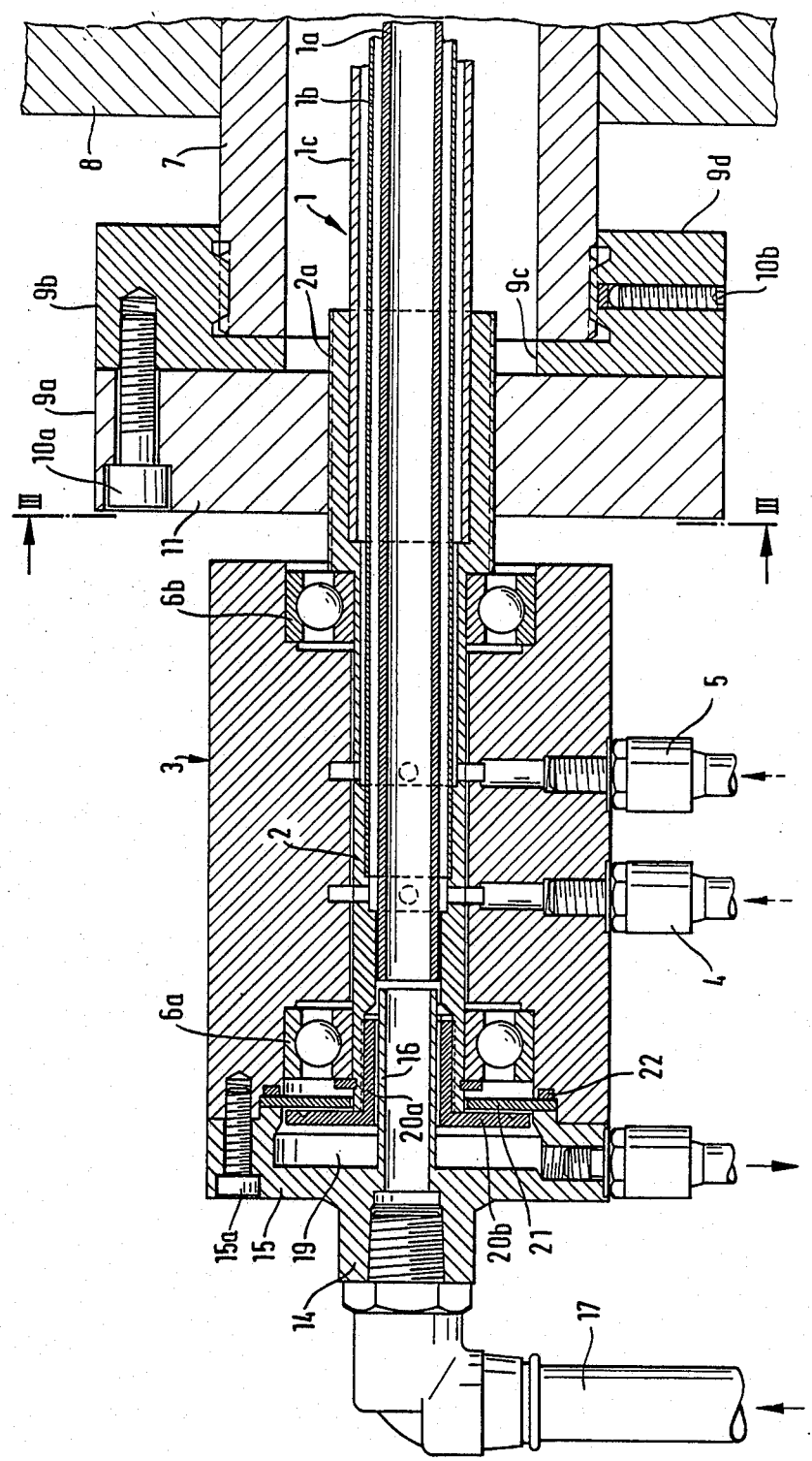
FIG. 1 is a longitudinally sectioned view of one end of an air feed tube assembly in accordance with the present invention shown coupled to a rotary air feed joint and to a rotary drive spindle.

As seen in the drawings, the air feed tube assembly 1 is of essentially conventional construction and comprises three coaxial tubes, namely an inner tube 1a, a central tube 1b and an outer tube 1c. A liquid coolant is arranged to flow through the inner tube 1a and a compressed air supply is selectively coupled between the tubes 1a and 1b and the tubes 1b and 1c. The left-hand extremity of the outer tube 1c is received in and secured to a flanged receiving end 2a of a coupling tube 2, into which coupling tube 2 extends the ends of the tubes 1b and 1a. The coupling tube 2 extends into an air feed joint 3, which joint is provided with air feed coupling ports 4 and 5, designed respectively to communicate with the spaces between the tubes 1a and 1b and 1b and 1c. The mode of coupling of the air feed ports 4 and 5 to the tube assembly is standard and will therefore not be described in detail.

The coupling tube 2 extends into a corresponding cylindrical cavity formed in the joint 3 and is supported by a pair of axially spaced apart rotary bearings 6a and 6b. Intermediate the bearings 6a and 6b, the tube 2 is minimally spaced away from the adjacent wall of the joint 3, thereby reducing to a minimum the frictional resistance to movement of the tube 2 with respect to the joint 3.

Figure 2:
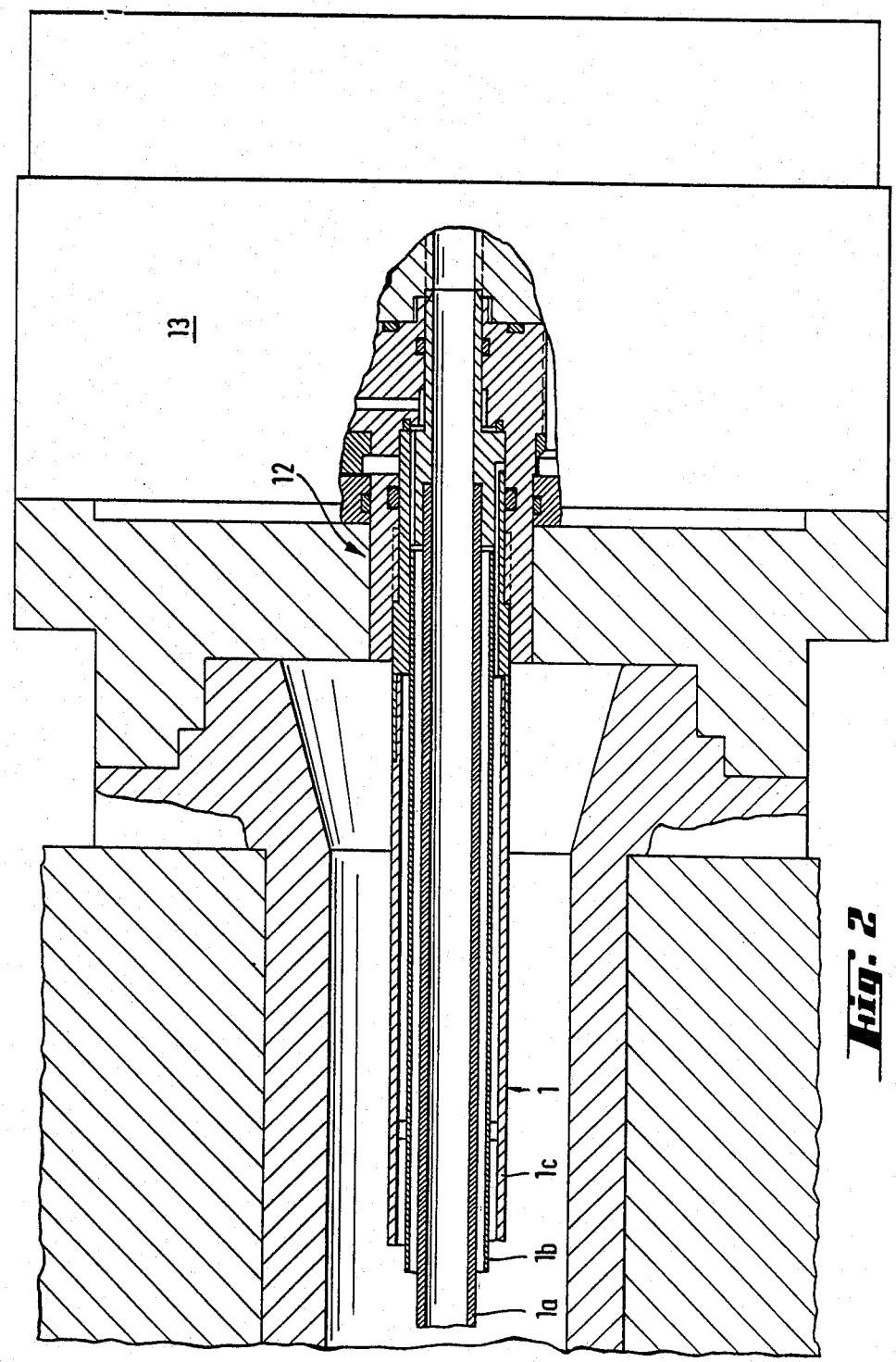
FIG. 2 is a longitudinally sectioned view of the air feed tube assembly shown coupled to a pneumatic chuck.
Figure 3:
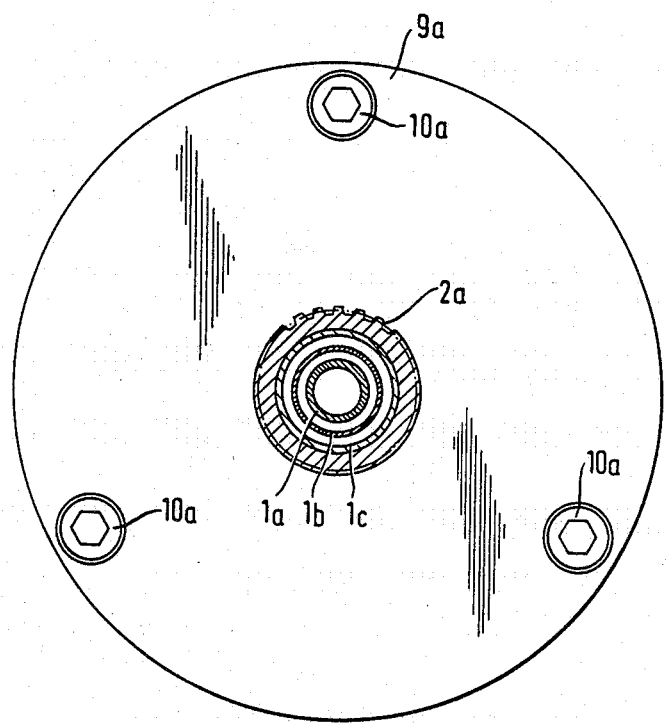
FIG. 3 is a cross-sectional view of a detail shown in FIG. 1, taken along the line III—III.

The tube assembly 1 is coupled to a drive spindle 7 of a turning lathe 8 by means of a coupling collar 9a and tubular adapter 9b. The collar 9a is formed with a central splined bore in which a splined end portion 2a of the coupling tube extends engagingly. The adapter 9b is formed with an annular end portion 9c interposed between the collar 9a and the spindle 7 and an internally threaded skirt portion 9d which surrounds and screw engages a correspondingly threaded end portion of the spindle 7. The collar 9a is secured to the adapter 9b by means of bolts 10a whilst the screw coupling of the adapter 9b to the spindle 7 is secured by means of bolts 10b. By virtue of interengaging serrations (see FIG. 3) of the end 2a of the coupling tube 2 and the bore surface of the collar 9a, the latter is effectively keyed to the coupling tube 2. Referring now to FIG. 2 of the drawings, it will be seen that a right-hand end 12 of the air feed tube assembly 1 is screw-coupled, in conventional manner, to a chuck assembly 13.

Reverting to FIG. 1 of the drawings, it will be seen that the joint 3 is provided with a liquid coolant inlet port 14 which is formed in an end cap 15 of the joint 3 and from which extends, centrally into the joint 3 a coolant duct 16 whose end abuts the adjacent end of the inner tube 1a. The inlet port 14 is, in its turn, coupled to a liquid coolant conduit 17. In view of the close proximity of the coupling of the liquid cooling port with the rotary bearings 6a, special means have to be provided so as to reduce to a minimum the possibility of leakage of the liquid cooling medium into the rotary bearings 6a.

Figure 4:
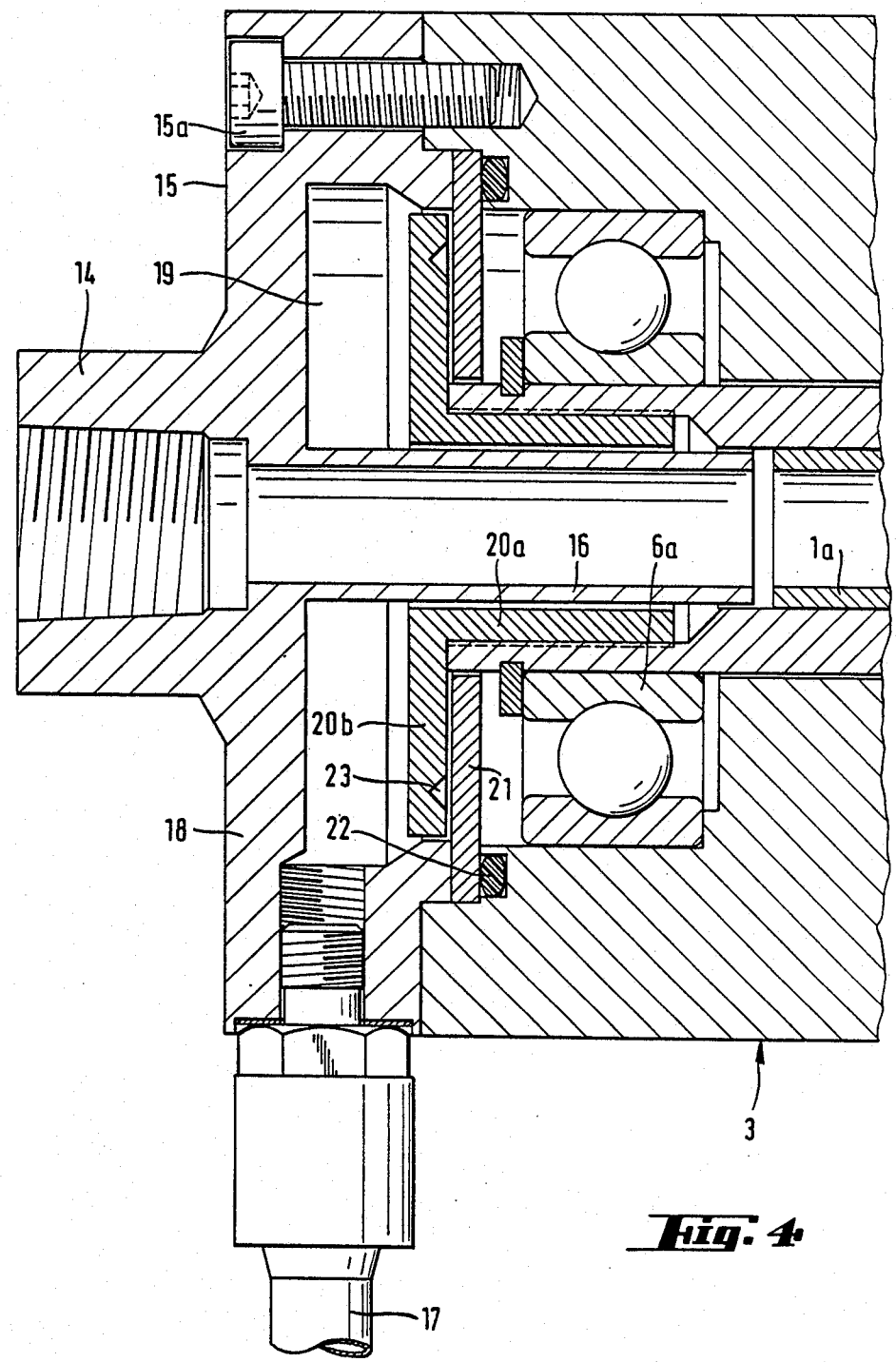
FIG. 4 is a view, on an enlarged scale, of a detail shown in FIG. 1.

The sealing means will now be described in detail with reference to FIG. 4 of the drawings. As can be seen, the cap 15, which is coupled to the joint 3 by means of coupling bolts 17, is formed with a coolant discharge port 18. Formed in the cap 15 is a coolant discharge space 19 which communicates with the discharge port 18, in which space is fitted a coupling plug. The latter has a horizontal limb 20a which surrounds the coupling tube 16 and a flanged limb 20b which is juxtaposed with respect to an annular sealing disc 21 which is pressed by the flange 20b against the surface of the joint 3 via an interposed sealing ring 22. Formed in the surface of the flange 20b adjacent the sealing disc 21 is a peripheral drainage channel 23.

The mode of operation of the air feed tube assembly as shown in the drawings will now be described. A drive imparted from the turning lathe 8 to the machine spindle 7 is transmitted via the keyed collar 9 to the air feed tube assembly and therefrom to the pneumatic chuck. By virtue of the key coupling between the feed spindle 7 and the air feed tube assembly, the sudden stopping of the spindle does not result in an unscrewing of the air feed tube assembly with respect to the pneumatic chuck assembly.

With the flow of a liquid coolant medium from the coolant supply conduit into the port 14, the bulk of the coolant, of course, flows through the coupling tube 16 into the juxtaposed coolant tube 1a. The possible leakage of the coolant medium between the coupling tube 16 and the limb 20a is shown in FIG. 4 of the drawings.

Thus, it can be seen that any coolant medium which leaks between the juxtaposed surfaces of the coupling tube 16 and the limb 20a passes into the space 19 and is discharged via the discharge port 18. Should, however, any residual coolant medium pass between the flanged limb 20b and the sealing disc 21, such residual coolant medium will pass into the peripheral passage 23 and is removed therefrom into the discharge port 18. In this way, there is formed an effective labyrinthine seal which effectively inhibits the passage of any coolant medium to the rotary bearings 6a.

Furthermore, in view of the fact that the air feed tube assembly is supported within the joint 3 between a pair of rotary bearings 6a and 6b and that intermediate these bearings contact between the assembly and the joint is effectively prevented, the frictional resistance to movement of the rotary tube assembly is reduced as is therefore the wear on the system and the power expenditure in driving the system.

I claim:

1. A rotary coaxial air feed tube assembly for a pneumatic chuck, comprising
    a first end of said assembly for screw coupling to a pneumatic chuck;
    a second end of said assembly for coupling to a rotary air feed joint;
    a first outer collar component to be secured to said drive spindle,
    a second and inner collar component to be secured to said tube assembly, and
    adjacent surfaces of said components provided with axially directed interengaging serrations,
    said collar components constituting a two piece annular collar and constituting keying means for coupling said feed tube assembly to a rotary drive spindle so as to impart a rotary drive to said assembly and said pneumatic chuck.

2. An air feed tube assembly according to claim 1, wherein a pair of axially spaced apart rotary bearings serve to couple said second end of said assembly to said rotary air feed joint.

3. An air feed tube assembly according to claim 2 wherein said rotary air feed joint is also provided with a liquid coolant supply coupling by means of which liquid coolant can flow through an innermost tube in the air feed tube assembly, liquid sealing means being provided for substantially preventing leakage of said liquid coolant into said rotary bearings.

4. An air feed tube assembly according to claim 3 wherein said liquid sealing means includes a liquid coolant discharge port and a labyrinthine path communicating at one end with said liquid coolant supply coupling and at an opposite end thereof with said discharge port.

* * * * *